United States Patent [19]

Dinklage et al.

[11] Patent Number: 5,246,750
[45] Date of Patent: Sep. 21, 1993

[54] RESIN COATED FABRIC FOR FOODSTUFF CASINGS

[75] Inventors: Horst Dinklage, Dieburg; Hans-Peter Wolf, Osterkappeln, both of Fed. Rep. of Germany

[73] Assignee: Röhm GmbH, Darmstadt, Fed. Rep. of Germany

[21] Appl. No.: 848,394

[22] Filed: Mar. 9, 1992

Related U.S. Application Data

[63] Continuation-in-part of Ser. No. 653,985, Feb. 11, 1991, abandoned, which is a continuation of Ser. No. 453,353, Dec. 18, 1989, abandoned, which is a continuation of Ser. No. 341,888, Apr. 24, 1989, abandoned, which is a continuation-in-part of Ser. No. 154,633, Feb. 10, 1988, abandoned.

[30] Foreign Application Priority Data

Feb. 13, 1987 [DE] Fed. Rep. of Germany ....... 3704563

[51] Int. Cl.$^5$ .................... B44D 1/52; B32B 27/12
[52] U.S. Cl. .................... 428/34.8; 428/36.2; 428/34.9; 428/222; 428/224; 428/245; 426/89; 426/106; 426/138; 427/259
[58] Field of Search .................... 428/264, 34.8, 36.2, 428/34.9; 427/259; 426/89, 106, 138

[56] References Cited

U.S. PATENT DOCUMENTS 3,922,398 11/1975 Bridgeford et al. ............... 427/259
4,525,418 6/1985 Dinklage et al. ................. 428/267

FOREIGN PATENT DOCUMENTS 1063112 8/1959 Fed. Rep. of Germany .

OTHER PUBLICATIONS

Ullmanns Encyklopädie er technischen Chemie, 4th Edition, vol. 15, pp. 291-293.

*Primary Examiner*—Patrick J. Ryan
*Assistant Examiner*—Richard P. Weisberger

[57] ABSTRACT

A method for making a fabric coated with acrylic resin and adaptable to use as a wrap for food products such as cheese or sausage, which comprises embedding a textile material of relatively low strength, such as a knitted fabric, scrim, or lightweight nonwoven fabric, in a coating layer of acrylic resin having thermoplastic properties, and for making a food wrap by cutting a blank therefor from such coated fabric, which blank is shaped into a wrap by heat sealing; fabrics and wraps made by such a method.

7 Claims, No Drawings

RESIN COATED FABRIC FOR FOODSTUFF CASINGS

This application is a continuation-in-part of pending application Ser. No. 07/653,985 filed Feb. 11, 1991, abandoned, which is a continuation of application Ser. No. 07/453,353 filed Dec. 18, 1989 and now abandoned, which in turn is a continuation of application Ser. No. 07/341,888 filed Apr. 24, 1989 and now abandoned, which in turn is a continuation-in-part of application Ser. No. 07/154,633 filed Feb. 10, 1988, and now abandoned.

The present invention relates to a method for making a resin coated fabric adaptable to packaging food products such as cheese or sausage, to a method for making food wraps therefrom, and to fabrics and wraps made by these methods.

Multiple-ply composite materials have increasingly gained acceptance for the direct contact packaging of food products, as practiced with certain kinds of cheese and particularly with sausage products. These materials may be multiple-ply composite synthetic resin materials in sheet form produced by co-extrusion or by subsequent coating, for example. Sausage casings made from film comprising regenerated cellulose (cellophane) are used on a large scale. The permeability of such films to water vapor can be modified by coating them and they can be made oil-and grease-proof. Polyvinylidene chloride in particular has proved itself as a coating material for cellophane film used as a packaging material in the food industry, for example as sausage casings. The coatings can be formulated to be heat sealable by incorporating further comonomers. (See Ullmanns *Encyklopaedie der technischen Chemie*, 4th edition, vol. 11, p. 678, p. 101.) Sausage casings for fresh and cooked sausages, produced from a synthetic nonwoven fabric stabilized by means of synthetic resins, are known from published German patent application OS 21 28 613. According to published German patent application OS 31 47 519, which corresponds to U.S. Pat. No. 4,525,418 incorporated herein by reference, textile wraps for the direct contact packaging of food products and which exhibit good tearing behavior, are permeable to gases and water vapor, and at the same time are practically liquid- and grease-proof and therefore are suitable also for use in the making of fresh, boiled, and cooked sausages, are obtained from fabrics coated with certain acrylic resins.

More in particular, the aforementioned resins are a binary mixture of 50 to 100 parts by weight of a first acrylate emulsion polymer having a glass transition temperature, $Tg_{max}$, below 0° C. and up to 50 parts by weight of a second acrylate emulsion polymer having a glass transition temperature, $Tg_{max}$, above 30° C., said first acrylate emulsion polymer comprising (a) at least 90 weight percent, based on the total first polymer, of a lipophilic monomer component comprising at least one member selected from the group consisting of esters of acrylic acid and of methacrylic acid with a lower alkanol, and from 0 to 10 weight percent, based on said lipophilic monomer, of at least one further co-monomer, the methyl methacrylate content of the first polymer not exceeding 40 weight percent of the total first polymer;

(b) a hydrophilic monomer component having acidic properties, in an amount from 0 to 5 weight percent, based on the total first polymer; and (c) a crosslinking monomer component in an amount from 0 to 7 weight percent, based on the total first polymer;

and said second emulsion polymer comprising (a) at least 95 weight percent, based on this total second polymer, of a lipophilic monomer component comprising more that 60 weight percent, based on this total lipophilic component, of methyl methacrylate, and of less than 40 weight percent, based on this lipophilic component, of at least one further member selected from the group consisting of esters of acrylic acid and/or of methacrylic acid with a lower alkanol, and from 0 to 10 weight percent, based on this lipophilic component of a further monomer; and (b) of less than 5 weight percent of a hydrophilic monomer component having acidic properties.

In the usual coating method, direct coating, a spreadable resin composition is applied directly to a textile base, as described in U.S. Pat. No. 4,525,418. The textile base may be coated on one or both sides. To obtain a thicker coat, coating may be repeated.

Direct coating calls for adequate strength in the textile substrate. As a rule, only woven fabrics and closely bonded nonwoven fabrics possess the requisite strength; knitted fabrics and lightweight nonwovens do not.

Thus, there has been a need for a textile packaging material for food products which is coated with acrylic resins corresponding to those used in U.S. Pat. No. 4,525,418 and which can be produced in particular from low strength fabrics, the coated textile material then being sealable by the use of heat or of an adhesive, except for filler openings, to form a wrap.

It has been found that food products wraps which substantially meet actual use requirement, in particular for artificial sausage casings, can be produced from open-mesh fabrics if these are coated with certain acrylic resins, as described for example in U.S. Pat. No. 4,525,418, by the so-called transfer or counter-coat process. Suitable base fabrics for the heat sealed wraps or for the heat sealable acrylic resin coated fabrics of the invention, respectively, are knitted fabrics, scrim, and lightweight nonwovens. These may be made from natural fibers, modified natural fibers, synthetic fibers, or mixtures thereof. Illustrative of these are fibers of cotton, linen, wool, regenerated cellulose, cellulose esters, polyamides, polypropylene, and polyacrylonitrile, among others. Of course, woven fabrics can also be coated by the transfer process and then used to package food products. This, however, is too expensive in comparison with the direct coating methods used up to now in the manufacture of food product wraps, and therefore disadvantageous, in contrast to the coating of open textiles such as knitted and nonwoven fabrics according to the present invention.

The invention relates to a wrap, adaptable to be filled with a food product and made of a fabric coated with acrylic resin, characterized in that, in its production, the fabric is embedded in a preformed coating layer or layers and that, after the resulting laminate has been dried, a blank for the wrap is cut therefrom and then sealed along its edges by heat sealing or adhesive bonding, except for a filler opening or openings.

The wrap of the invention is advantageously produced from low strength fabrics, such as knitted fabrics, scrim, or open nonwovens. For the production of the acrylic resin coating, acrylate emulsion polymers of the type described particularly in U.S. Pat. No. 4,525,418 are used.

The principal advantage of the wraps of the invention is that the coating can be applied to open mesh textile bases which, in the manufacture of textile based wraps for food products, provide significant economic benefits over the nonwoven fabrics used until now.

The use properties of the novel wraps meet the mechanical and processing requirements imposed on them. Thus, they can be used as casings not only for fresh, boiled, and cooked sausages, but also for almost any other type of sausage. Much like natural gut, they possess good strength, including tear resistance. The permeability to gases and water vapor of the novel wraps can be adapted to their end use by varying the composition of the acrylic resin coating within the limits established in U.S. Pat. No. 4,525,418, as well as the coating thickness. The wraps can be readily cut to size. The cut-to-size blank is easily given the desired shape of the wrap by heat sealing, that is by the application of heat and pressure to the thermoplastic acrylic resin coating, or by high frequency sealing of the edges. Optionally, a separate adhesive, for example a hot melt adhesive, may be used concurrently in sealing the edges.

The acrylic resins to be used for the coating of textile material according to the invention are copolymers of a lipophilic monomer component comprising esters of acrylic acid and/or of methacrylic acid with $C_1$ to $C_5$ alcohols for example, and of a hydrophilic monomer component which, in addition to a hydrophilic monomer with acid properties, such as acrylic acid, methacrylic acid, crotonic acid, or maleic acid, may contain further hydrophilic monomers such as hydroxyalkyl esters of acrylic acid and/or methacrylic acid, for example 2-hydroxyethyl acrylate or 2-hydroxyethyl methacrylate. The amount of lipophilic monomers in the polymers to be used for the acrylic resin coating will range approximately from 90 to 99 percent by weight. In the preparation of the copolymer, further monomers such as styrene, alpha-methyl styrene, or vinyl acetate may be used concurrently. As a rule, their amount will then range from 0.10 to 10 percent by weight of the lipophilic monomers. They are used to impart specific mechanical properties to the coating. Crosslinking monomeric components may also be used, if desired. However, the acrylic resin coating must be sufficiently thermoplastic, that is heat sealable, to permit heat sealing of the resin coated textile material. That mean that the coating should not be crosslinked, or then only slightly.

Acrylic resin copolymer compositions suitable for the coating of fabrics for food product wraps are described in aforementioned U.S. Pat. No. 4,525,418, for example. These are suitable also for the wraps of the invention, produced by coating fabrics by the transfer process with acrylic resins formulated to be heat sealable. To improve the heat sealability of the resins, the glass transition temperature, $Tg_{max}$, of the first acrylate emulsion polymer of the patent may be somewhat higher than that of the preferred resins disclosed in the patent. Namely, as discussed further below, the monomers are so chosen in nature (i.e. whether "hard" or "soft") and amount that the glass transition temperature of their copolymer may be above 0° C., but is below 30° C., suitably below 20° C. The viscosity of the coating composition is adjusted by the addition of a thickening agent approved for food products, for example hydroxyethylcellulose (commercially available as "Natrosol") or ethyl acrylate/methacrylic acid copolymers (commercially available as "Rohagit"), so that it will be from 20,000 to 80,000 mPa s.

The production of the acrylic resins suitable for the coating is known per se. Reference is made to the aforementioned U.S. Pat. No. 4,525,418 and the prior art discussed therein, for instance.

The coated textile material may comprise one or more acrylic resin layers. When the packaging material is built up from more than one acrylic resin layer, the various resin layers may be of different thicknesses and polymeric compositions.

The hardness of the coating can be predetermined by the ratio of comonomers and particularly by the ratio of acrylic esters, and especially of butyl acrylate, to methacrylic esters such as methyl methacrylate, in the copolymer. However, it can also be controlled by the use of a blend of an acrylic resin dispersion formulated to be "soft", that is of a resin with a predominant amount of acrylic esters, and particularly of butyl acrylate, and of a "harder" acrylic resin dispersion containing predominantly methyl methacrylate, for example.

Various properties of the food product wrap, such as its water vapor permeability, or the peelability of sausages, can be optimized by the addition of proteinaceous or cellulosic materials such as collagen or regenerated cellulose in amounts from 0.1 to 20 percent by dry weight of the acrylic resin coating compositions. These substances are admixed, for example as solutions, with the acrylic resin dispersions before coating is effected. However, all of the coatings will have acrylic resin character.

Food product wraps according to the invention are obtained by embedding the fabric base in a previously prepared, as yet unsolidified, coating composition, rather than by direct spread-coating of acrylic resin dispersions onto the fabric. Both techniques are known to be employed in the manufacture of artificial leather, for example. Unlike the direct spreadcoating of the fabric, the so-called transfer process permits the use of very lightweight textile materials, sensitive to tension, since the fabrics do not have to be pulled through a coating machine. (See Ullmanns, op. cit., vol. 15, pp. 166-168.)

The food product wraps to be manufactured by the process of the invention, which wraps can be used to advantage as casings for various types of sausages, are usually provided with more than one synthetic resin coat, mostly with two acrylic resin coats. To this end, a first resin coat is spread onto a endless backing web, suitably a paper web, e.g. a web of release paper. After the first coat has dried, a second coat of resin is applied and a fabric web is then embedded therein before this coat has dried. After the laminate has been dried at temperatures of about 100° C. to 140° C. the composite is separated from the backing web. Normally, the coating first applied to the backing web is the outer surface when the composite acrylic resin coated fabric is used as a packaging material for food products.

For the production of this top coat, which is the coating first applied to the backing, of paper for example, and which becomes the outer layer of the wrap, an acrylic composition is used which is preferably formulated to be somewhat "harder". This composition can be prepared by blending an acrylic resin emulsion having a relatively "soft" character, for example a butyl acrylate/methyl methacrylate/hydroxyethyl acrylate/methacrylic acid copolymer containing less than 45 percent by weight of methyl methacrylate, with a "harder" acrylic resin emulsion containing more than 60 percent by weight of methyl methacrylate. Usable top coats can thus be produced from blends of such emulsion polymers in ratios from 8:2 to 6:4, and more particularly in a ratio of 7:3, in parts by weight of copolymers having a relatively soft character to polymers of harder resin character, respectively.

The coating composition for the second-applied coat (or innermost coating of the wrap) is again an acrylic resin, formulated to be relatively soft and containing less than 45 percent by weight of methyl methacrylate and, as hydrophilic components, particularly acrylic acid or methacrylic acid in an amount of about 1 percent by weight, as well as hydroxyalkyl esters of acrylic acid or methacrylic acid, for example in amounts from 0 to 10 percent by weight. In the coating operation in accordance with the present invention, dispersions having a solids contents higher than 50 percent, for example of at least 55 percent by weight (see published German patent application OS 19 10 488, for example), are advantageously used.

Depending on the nature of the embedded fabric and on the intended end use of the wraps produced, the amount of coating composition used may vary within certain limits. For example, in the coating of textile materials by the transfer process, from about 30 g to about 90–100 g per square meter, and more particularly from 40 g to 80 g per square meter, of dry polymer, will be needed per coat to produce casings for cooked or boiled sausages.

The thickness of the acrylic resin coating should be from 40 to 100 microns, and more particularly from 60 to 80 microns. In the case of a multiple-layer acrylate structure, the last-applied coat in which the fabric is embedded is normally thicker than the preceding layer or layers.

The water vapor permeability or transmission (as determined in conformity with German standard DIN 53 112) of food product wraps produced by the method of the invention is considerably lower than that of food packaging materials made by direct coating with the same amount of acrylic resin substance. In the case of the wraps of the invention, it is about 100/g/m²/24 hr. or less, whereas textile materials direct-coated with comparable amounts of acrylic resin exhibit water vapor transmission rates of over 200 g/m²/24 hr. Lower water vapor transmission rates are of advantage in the storage of many food products. Intermediate values can be readily obtained by the concurrent use of proteinaceous and/or cellulosic materials.

From the coated fabric web, portions in the desired shape of the food product wrap, for example a sausage casing, are cut or punched out by known methods. During or following this operation, the coated fabric may be subjected to a further operation, such as the embossing of a pattern in the packaging material.

The open sides of the blank are placed face to face and then heat sealed as much as possible by the use of heat and pressure by methods commonly used with thermoplastic coatings. A tightly sealed composite wrap is so obtained. By coating a hot melt adhesive such as a polyamide adhesive onto the edges of the polyacrylate coated fabric, an additional heat sealing and bonding coat is obtained.

The hydrophilic monomers referred to earlier are monomers whose solubility in water at 20° C. is greater than 6 weight percent, while the monomers referred to as hydrophobic have a solubility of 6 weight percent or less.

In the invention, "harder" acrylic resins are acrylic polymers formed of a relatively large amount of monomers which, as homopolymers, each have a glass transition temperature, Tg, above 30° C., in contrast with "softer" acrylic resins composed of a relatively large amount of monomers which, as homopolymers, each have a glass transition temperature less than 30° C. (See Ullmanns, op.cit, vol. 15, pp. 215–222; J. Brandrup and E. H. Immergut, *Polymer Handbook*, 2nd edition, 1975, III, pp. 139–154.)

A better understanding of the present invention and of its many advantages will be had by referring to the following specific examples, given by way of illustration, in which the parts are parts by weight.

EXAMPLE 1

A coating material having the following composition was coated with a doctor blade onto water resistant release paper ("Stripkote CIS"):

800 parts of a 50% dispersion of a first emulsion polymer,
200 parts of a 50% dispersion of a second emulsion polymer,
7 parts of hydroxyethylcellulose thickener (e.g. "Natrosol 250 HR"), and
50 parts of water.

The first emulsion polymer, which has a glass transition temperature, $Tg_{max}$, of +10° C., was prepared from the following monomer mixture:

55.5 parts of butyl acrylate,
39.0 parts of methyl methacrylate,
5.0 parts of hydroxyethyl acrylate, and
0.5 part of methacrylic acid.

The second emulsion polymer was prepared from the following monomer mixture:

65.0 parts of methyl methacrylate,
34.0 parts of butyl acrylate, and
1.0 part of methacrylic acid.

A fixed, warp-knitted polyamide fabric having a weight of 17 g/m² was laminated under light pressure into the aforementioned coating layer, applied in a thickness of 0.12 mm. This laminate was dried with circulating air at a temperature from 100° C. to 120° C. and the release paper was then removed.

The resin coating contained about 60 g of solids square meter. The water vapor transmission rate was 100 g/m²/24 hr.

After being filled with sausage meat, sausage casings made from the material and heat sealed (sealing time, 1 sec.; sealing pressure, about 4 bar; sealing temperature, 180° C.–200° C.) were found to have a seal that proved resistant to boiling.

EXAMPLE 2

A top coat of a coating material composed of
700 parts of a 50% dispersion of a first emulsion polymer,
300 parts of a 50% dispersion of a second emulsion polymer,
80 parts of a 30% dispersion of a third emulsion polymer, diluted with water in a weight ratio of 1:3, and
10 parts of a 25% aqueous ammonia solution was applied in a thickness of 0.1 mm to release paper and dried with circulating air at 100° C.–120° C. The resulting coating contained 50 g of solids/m².

The first and second emulsion polymers were prepared as in Example 1, which the third emulsion polymer was an ethyl acrylate/methacrylic acid copolymeric thickener ("Rohagit SD15").

A coating material having the following composition was applied thereover as a laminating coat in a thickness of 0.15 mm and with a solids content of 75 g/m$^2$:
- 1000 parts of a 50% dispersion of the aforesaid first emulsion polymer,
- 80 parts of a 30% dispersion of the aforesaid third emulsion polymer, diluted with water in a weight ratio of 1:3, and
- 10 parts of a 25% aqueous ammonia solution.

A nonwoven fabric having a weight of 30 g/m$^2$, made of polyester/rayon staple (80/20), was embedded in this coat and the laminate was then dried at 120° C. to 130° C.

The acrylic resin/fabric laminate from which the paper base had been stripped had a water vapor transmission rate of 60 g/m$^2$/24 hr. and exhibited the good heat sealability mentioned in Example 1.

EXAMPLE 3

A food product wrap according to the invention was produced by the method used in Example 2 using an elastic, unfixed, warp-knitted polyamide fabric weighing 25 g/m$^2$.

EXAMPLE 4

60 parts of carboxymethylcellulose ("Blanose 72 12EL", Hercules, Wilmington, Del.) were well mixed at about 20° C. first with 300 parts of water at room temperature and then with 1000 parts of the emulsion polymer I (see Example 1). Ten minutes later the paste was ready for coating.

A release paper was laminated with a coat of the paste in a thickness of 0.15 mm and a warp-knitted polyester fabric was embedded into this coat. This laminate was dried with circulating air at a temperature from 100° C. to 120° C. and then the release paper was removed.

EXAMPLE 5

A: 600 parts of proteinaceous material in the form of a powder ("Lactovit WB1", Lactovit, Düsseldorf, Germany) are well mixed with 500 parts of ethanol, then diluted with 3575 parts of water, and 275 parts of a stabilizing agent (product of Lactovit) are added. The suspension is warmed up to 60° C. with stirring for solubilization.

B: This is a mixture made from 1000 parts of emulsion polymer I (see Example 1), 150 parts of water, 50 parts of emulsion polymer III (see Example 2), and 10 parts of a 25 percent aqueous ammonia solution.

To prepare a paste for coating, 1000 parts of B and 500 parts of A were mixed and a release paper was laminated with the mixture. To prevent solidification because of the proteinaceous material, the coating mass was held at 40° C. to 50° C. A warp-knitted polyamide fabric was embedded into the polyacrylate coat containing the proteinaceous material. The laminate was dried at a temperature from about 100° C. to 120° C. and then the release paper was removed.

What is claimed is:

1. A heat-sealable fabric coated with thermoplastic acrylic resin and adaptable to use as a food wrap having a water vapor permeability of about 100 g/m$^2$/24 hr, made by depositing at least one layer of an acrylic resin onto a release backing from an aqueous acrylic resin dispersion, completely embedding a lightweight fabric weighing less than 70 g/m$^2$ into said resin layer to form a laminate, and then drying said laminate, said resin layer comprising a binary mixture of 50 to 100 parts by weight of a first acrylate emulsion polymer having a glass transition temperature, $Tg_{max}$, above 0° C. but below 30° C., and up to 50 parts by weight of a second acrylate emulsion polymer having a glass transition temperature, $Tg_{max}$, above 30° C., said first acrylate emulsion polymer comprising (a) at least 90 weight percent, based on the total first polymer, of a lipophilic monomer component comprising at least one member selected from the group consisting of esters of acrylic acid and of methacrylic acid with a lower alkanol, and from 0 to 10 weight percent, based on said lipophilic monomer, of at least one further comonomer, the methyl methacrylate content of the first polymer not exceeding 40 weight percent of the total first polymer;

(b) a hydrophilic monomer component having acidic properties, in an amount from 0 to 5 weight percent, based on the total first polymer; and (c) a crosslinking monomer component in an amount from 0 to 7 weight percent, based on the total first polymer;

and said second emulsion polymer comprising (a) at least 95 weight percent, based on this total second polymer, of a lipophilic monomer component comprising more than 60 weight percent, based on this total lipophilic component, of methyl methacrylate, and of less than 40 weight percent, based on this lipophilic component, of at least one further member selected from the group consisting of esters of acrylic acid and/or of methacrylic acid with a lower alkanol, and of from 0 to 10 weight percent, based on this lipophilic component, of a further monomer; and (b) of less than 5 weight percent of a hydrophilic monomer component having acidic properties.

2. A coated fabric as in claim 1 wherein said lightweight fabric is a knitted fabric, scrim, or a nonwoven fabric.

3. A coated fabric as in claim 1 wherein said resin coating includes from 0.1 to 20 percent, by weight of the dry resin, of a modifying additive selected from the group consisting of proteinaceous and cellulosic materials.

4. A coated fabric as in claim 1 wherein said lightweight fabric weighs from 10 to 60 g/m$^2$.

5. A coated fabric as in claim 1 wherein said lightweight fabric weighs from 10 to 50 g/m$^2$.

6. A coated fabric as in claim 1 wherein said acrylic resin is thermoplastic.

7. A coated fabric as in claim 6 in the form of a food wrap having a filler opening therein, made by the additional steps of cutting a sized blank from the laminate after drying and then heat sealing said blank to form said food wrap.

* * * * *